(12) United States Patent
Nakanowatari (10) Patent No.: US 8,614,804 B2
(45) Date of Patent: Dec. 24, 2013

(54) DOCUMENT MANAGEMENT SYSTEM, DOCUMENT MANAGEMENT METHOD AND COMPUTER READABLE MEDIUM

(75) Inventor: Takanori Nakanowatari, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 924 days.

(21) Appl. No.: 12/726,865

(22) Filed: Mar. 18, 2010

(65) Prior Publication Data

US 2011/0051172 A1   Mar. 3, 2011

(30) Foreign Application Priority Data

Aug. 28, 2009   (JP) .................................. 2009-197744

(51) Int. Cl.
*H04N 1/00* (2006.01)
(52) U.S. Cl.
USPC ......... 358/1.14; 358/1.15; 358/1.18; 358/1.4; 726/1; 726/3; 726/27
(58) Field of Classification Search
USPC ........... 358/1.14, 1.15, 1.18, 1.4; 726/1, 3, 27
See application file for complete search history.

(56) References Cited

U.S. PATENT DOCUMENTS

| 7,958,147 B1* | 6/2011 | Turner et al. | 707/783 |
| 2006/0095566 A1* | 5/2006 | Kanai | 709/224 |
| 2006/0256370 A1* | 11/2006 | Murakawa | 358/1.15 |
| 2006/0256375 A1* | 11/2006 | Abe | 358/1.15 |
| 2007/0100765 A1* | 5/2007 | Naganuma | 705/59 |
| 2008/0127307 A1* | 5/2008 | Fukuta | 726/3 |

FOREIGN PATENT DOCUMENTS

JP   2007-26109 A   2/2007

* cited by examiner

*Primary Examiner* — Allen H Nguyen
(74) *Attorney, Agent, or Firm* — Sughrue Mion, PLLC (57) ABSTRACT

According to an aspect of the invention, a document management system includes a document state storage unit, a manipulation control unit, a stamp image storage unit, and a state change unit. The document state storage unit stores document state information representing states concerning document validity of electronic documents stored in a document storage unit. The manipulation control unit refuses a request from a user for manipulating one of the electronic documents when the document state information corresponding to the one of the electronic documents indicates that the one of the electronic documents is invalid at present. The stamp image storage unit stores a plurality of stamp images each corresponding to any one of possible states represented by the document state information.

6 Claims, 11 Drawing Sheets

| DOCUMENT ID | POLICY ID | DOCUMENT TYPE | STATUS |
|---|---|---|---|
| A-DOC-654 | AABB12345 | CURRICULUM VITAE | VALID |
| A-DOC-655 | AABB12345 | CURRICULUM VITAE | VALID |
| A-DOC-656 | AABB12345 | CURRICULUM VITAE | TEMPORARY STOP |
| T-DOC-114 | AADD45678 | TECHNICAL DOCUMENT | INVALID |
| P-DOC-219 | AADD45678 | PRESS DOCUMENT | VALID |
| R-DOC-154 | AZBZ56789 | REPORT | INVALID |
| R-DOC-319 | AZBZ56789 | REPORT | VALID |

FIG. 3

| POLICY ID | POLICY NAME | USER/GROUP | MANIPULATION RIGHT | |
|---|---|---|---|---|
| | | | DOCUMENT MANIPULATION RIGHT | DOCUMENT STATUS CHANGE RIGHT |
| AABB12345 | TOP-SECRET DOCUMENT | PLANNING 1 GROUP | View, Edit | TEMPORARY STOP |
| | | PERSONNEL DEPARTMENT | View, Edit | TEMPORARY STOP, INVALIDATION |
| | | TANAKA TAROU | View | VALIDATION |
| AADD45678 | SECRET DOCUMENT | FUJI HANAKO | View, Edit, Print | TEMPORARY STOP |
| | | PUBLIC RELATIONS | View, Edit | TEMPORARY STOP |
| | | FIRST HEADQUARTERS | View | |
| AZBZ56789 | FOR INTERNAL USE ONLY | HEAD OFFICE STAFF MEMBER | View, Edit, Print | |
| | | PLANNING GROUP | View, Edit, Copy | TEMPORARY STOP |
| | | EDIT STAFF | View, Edit | |
| | | HEAD OFFICE STAFF | View | |

FIG. 4

| STAMP | STATUS CHANGE |
|---|---|
| 文書の一時停止 | TEMPORARY STOP OF DOCUMENT |
| 文書の無効化 | INVALIDATION OF DOCUMENT |

| POLICY ID | POLICY NAME | USER/GROUP | MANIPULATION RIGHT | | POLICY STATUS |
| --- | --- | --- | --- | --- | --- |
| | | | DOCUMENT MANIPULATION RIGHT | DOCUMENT STATUS CHANGE RIGHT | |
| AABB12345 | TOP-SECRET DOCUMENT | PLANNING 1 GROUP | View, Edit | TEMPORARY STOP | VALID |
| | | PERSONNEL DEPARTMENT | View, Edit | TEMPORARY STOP, INVALIDATION | |
| | | TANAKA TAROU | View | VALIDATION | |
| AADD45678 | SECRET DOCUMENT | FUJI HANAKO | View, Edit, Print | TEMPORARY STOP | VALID |
| | | PUBLIC RELATIONS | View, Edit | TEMPORARY STOP | |
| | | FIRST HEADQUARTERS | View | | |
| AZBZ56789 | FOR INTERNAL USE ONLY | HEAD OFFICE STAFF MEMBER | View, Edit, Print | | TEMPORARY STOP |
| | | PLANNING GROUP | View, Edit, Copy | TEMPORARY STOP | |
| | | EDIT STAFF | View, Edit | | |
| | | HEAD OFFICE STAFF | View | | |

FIG. 11

| STAMP | STATUS CHANGE |
|---|---|
| 文書の一時停止 | TEMPORARY STOP OF DOCUMENT |
| 文書の無効化 | INVALIDATION OF DOCUMENT |
| ポリシーの一時停止 | TEMPORARY STOP OF POLICY |
| ポリシー無効 | INVALIDATION OF POLICY |

| STAMP | STATUS CHANGE | PRIORITY |
|---|---|---|
| 文書の一時停止 | TEMPORARY STOP OF DOCUMENT | 4 |
| 文書の無効化 | INVALIDATION OF DOCUMENT | 3 |
| ポリシーの一時停止 | TEMPORARY STOP OF POLICY | 2 |
| ポリシー無効 | INVALIDATION OF POLICY | 1 |

DOCUMENT MANAGEMENT SYSTEM, DOCUMENT MANAGEMENT METHOD AND COMPUTER READABLE MEDIUM

CROSS-REFERENCE TO RELATED APPLICATIONS

This application is based upon and claims priority under 35 USC 119 from Japanese Patent Application No. 2009-197744, filed Aug. 28, 2009.

BACKGROUND

Technical Field

This invention relates to a document management system, a document management method, and a computer readable medium.

SUMMARY OF THE INVENTION

According to an aspect of the invention, a document management system includes a document state storage unit, a manipulation control unit, a stamp image storage unit, and a state change unit. The document state storage unit stores document state information representing states concerning document validity of electronic documents stored in a document storage unit. The manipulation control unit refuses a request from a user for manipulating one of the electronic documents when the document state information corresponding to the one of the electronic documents indicates that the one of the electronic documents is invalid at present. The stamp image storage unit stores a plurality of stamp images each corresponding to any one of possible states represented by the document state information. The state change unit changes the document state information concerning a given electronic document of the electronic documents to represent a given state, when a given stamp images of the stamp images stored in the stamp storage unit is determined to correspond to a read stamp image read from a paper document input by the user and the given stamp image corresponds to the given state, the given electronic document corresponding to the paper document.

BRIEF DESCRIPTION OF THE DRAWINGS

Exemplary embodiments of the invention will be described in detail based on the following figures, wherein.

DETAILED DESCRIPTION

Figure 1:
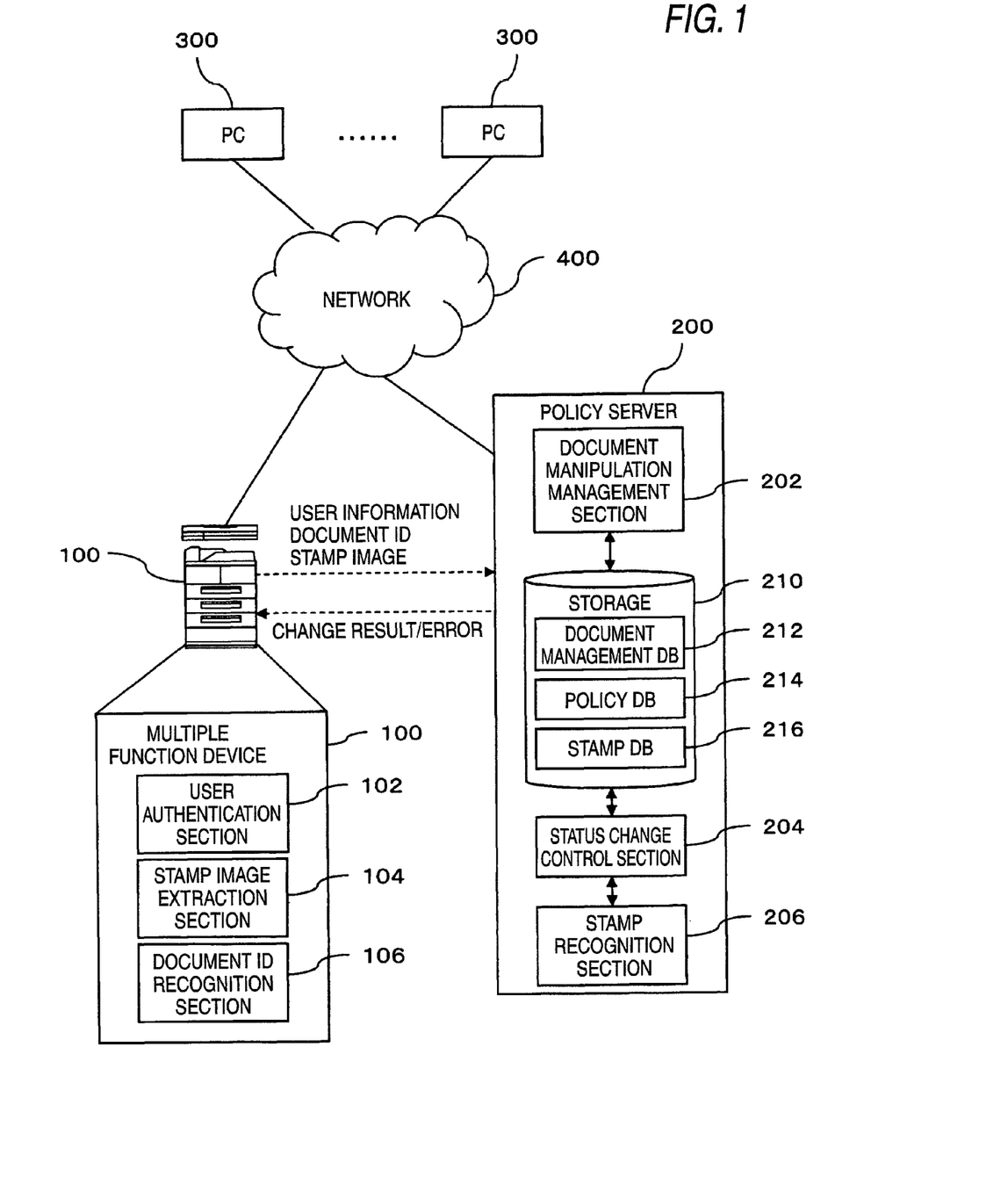
FIG. 1 is a drawing to show an example of the system configuration of an embodiment of the invention.

FIG. 1 shows an example of a document management system of an embodiment of the invention. The system includes a multiple function device 100 and a policy server 200. The multiple function device 100 and the policy server 200 are connected to a network 400 such as a local area network and accept a processing request from one or more PCs (personal computers) 300 operated by each user.

The multiple function device 100 is a device including multiple functions of a network printer, a network scanner, and a copier. The multiple function device 100 include the functions of executing print processing upon reception of a print command from the PC 300, for example, and scanning or copying a document set in a document feeder in response to user's operation for a local user interface (UI) of the multiple function device 100. In addition to the basic functions, the multiple function device 100 also includes a user authentication section 102 for conducting user authentication to accept operation using the local UI. The user authentication section 102 is a device for reading an IC card storing authentication information of the user and conducting user authentication, for example. The multiple function device 100 also includes a stamp image extraction section 104 for extracting a stamp image from an image provided by scanning and a document ID recognition section 106 for recognizing the document ID contained in the image. The stamp image extraction section 104 and the document ID recognition section 106 are described later in detail.

The policy server 200 is a server for performing control or management for security (information protection) about an electronic document to be managed. The electronic document is electronic data represented in a predetermined data format. For the control or management, a security policy is assigned to each electronic document. The security policy is information describing what manipulation each user is permitted to perform for each electronic document, and can be called manipulation right information. Conversely, it can also be said that the security policy is information indicating what limitation each user receives on manipulation of an electronic document; the security policy can also be called manipulation limitation information. Manipulations for an electronic document include view, edit, print, electronic copy, FAX transmission, etc., for example.

In the Specification, the "user" contains not only one user, but also a group made up of two or more users. If the user makes a request for one manipulation for one electronic document, the policy server 200 references the security policy assigned to the electronic document, thereby determining whether or not the user is permitted to perform the manipulation for the electronic document. The request is accepted only if the user is permitted to perform the manipulation.

To perform such control, a document management DB (database) 212 and a policy DB 214 are stored in storage 210 of the policy server 200.

Figure 2:
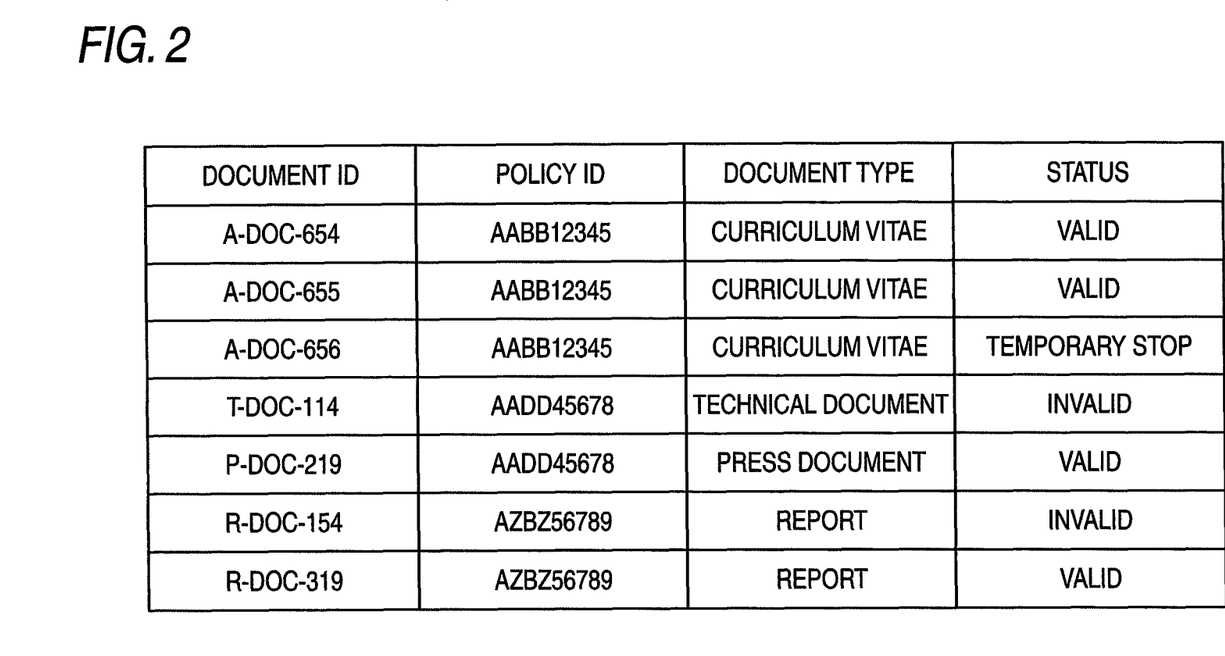
FIG. 2 is a drawing to show an example of the data descriptions of a document management DB.

The document management DB 212 is a database for storing information indicating which security policy is assigned (applied) to each electronic document to be managed. FIG. 2 shows an example of the data descriptions of the document management DB 212. In this example, the document management DB 212 contains information of document ID of identification information of each electronic document, policy ID of identification information of the security policy applied to the electronic document, document type of electronic document, and status representing the state concerning the validity of the electronic document for each electronic document to be managed. The electronic document is registered in a document DB (not shown) in association with the document ID. The document DB may be provided in the policy server 200 or may be in a different computer on the network 400. An electronic document group stored in a plurality of document DBs existing on the network 400 may be managed in one policy server 200. The security policy may be assigned to each electronic document by the creator or the administrator of the document according to a known method, for example.

In the example, the status includes three states of "valid", "temporary stop", and "invalid". The "valid" is a state in which the electronic document is valid in the organization using the system, in other words, a state in which the electronic document can be used from the user in the system. That is, if the electronic document is "valid", the user can manipulate, namely, use the electronic document in the range fitted to the security policy applied to the electronic document. In contrast, the "invalid" is a state in which the electronic document is invalid in the organization, namely, a state in which the electronic document cannot be used in the system. If the electronic document is "invalid", no users can use the electronic document regardless of the security policy. In document management in the organization, when a new created electronic document is registered in the system (namely, is stored in the document DB and is assigned the security policy), the document is made "valid" and is used from some users. For example, when a job using the electronic document is complete, the status of the electronic document is changed to "invalid" and the document is placed in a state in which it cannot be used. In the example, it is assumed that the status of the electronic document once made "invalid" cannot be changed.

Another status, "temporary stop", is a state in which the electronic document cannot temporarily be used from the user. For example, if an error is found in an electronic document laid open, to avoid viewing the electronic document containing the error by the user, the status of the electronic document is changed to "temporary stop". While the status is "temporary stop", no users can use (manipulate) the electronic document. The document in "temporary stop" can be restored to "valid" or can be made "invalid". After the status of the document is changed to "temporary stop", when a predetermined time has elapsed or when a predetermined condition is satisfied, automatically, the status of the document may be restored to "valid".

As seen from above, the status may also be understood as the state concerning manipulation permission/no permission of the document.

The status of the electronic document can be changed within the range of the change right according to a command of the user having the change right of the status. To change the status of the electronic document, for example, the user logs in to the policy server 200 from the PC 300 of the user and performs change manipulation. In the embodiment, a mechanism for the user to give a command for changing the status of the electronic document using the print result of the electronic document is provided.

Figure 3:
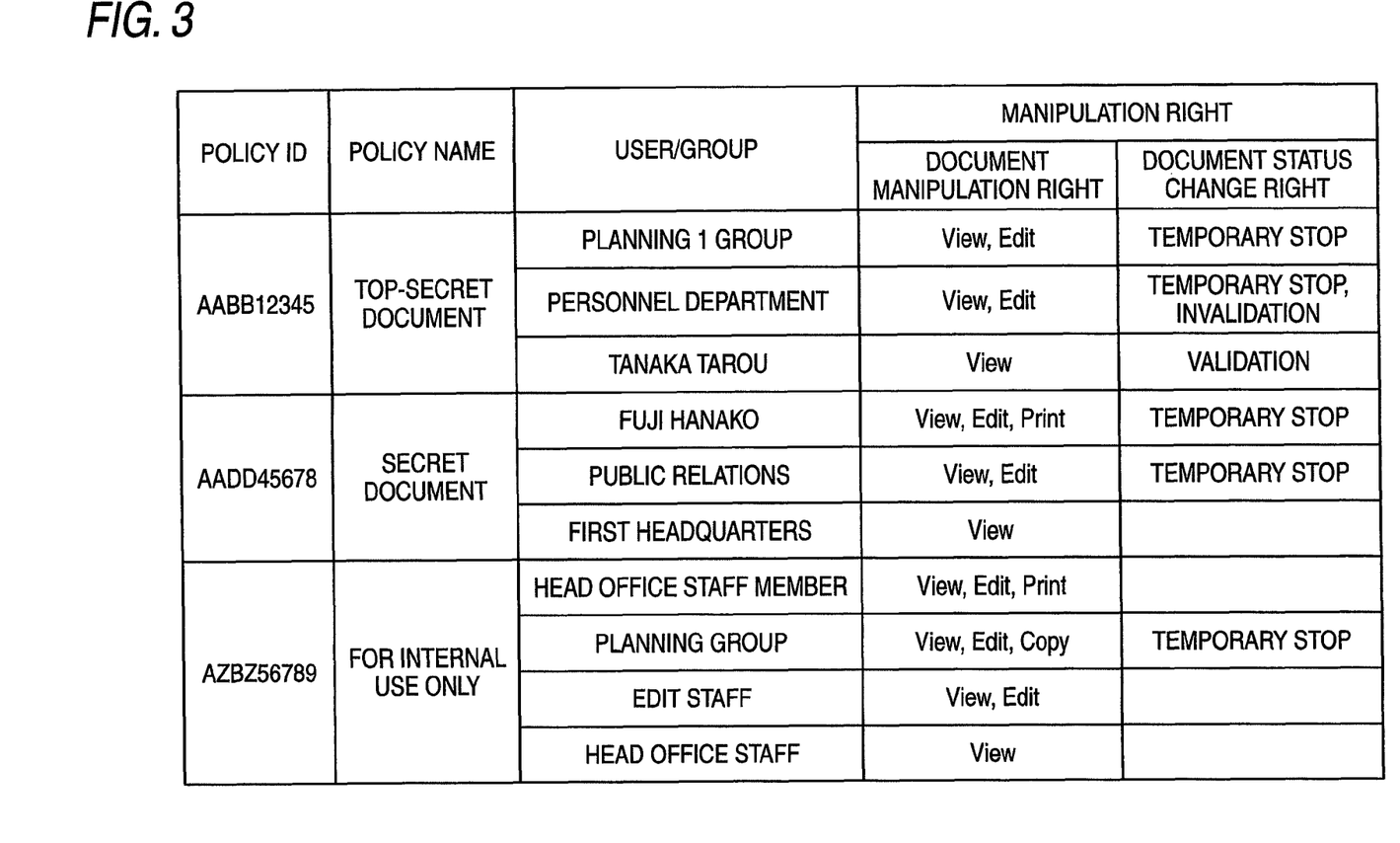
FIG. 3 is a drawing to show an example of the data descriptions of a policy DB.

The policy DB 214 stores records indicating the descriptions of the security policies for each of one or more security policies (which will be hereinafter called simply "policies") used in the system. FIG. 3 shows an example of the data descriptions of the policy DB 214. In this example, the record of each policy contains the policy ID of identification information of the policy and the policy name of the name of the policy. It also contains the descriptions of the manipulation right for the document ("document manipulation right") recognized for the user and the change right for the status of the document ("document status change right") for each user (group) permitted to perform some manipulation for the electronic document to which the policy is applied. For example, the user belonging to "planning 1 group" has the rights of view and edit for the electronic document to which the policy with policy ID "AABB12345" on the top in FIG. 3 is assigned, and also has the right of changing the status of the document to "temporary stop". The user belonging to "personnel department" has the rights of view and edit for the document to which the policy is assigned and further has the right of changing the status of the document to "temporary stop" or "invalid". Which group each user belongs to is managed in a directory server (not shown) or a personnel information server (not shown), and the policy server 200 references the information managed by the server.

Figure 4:
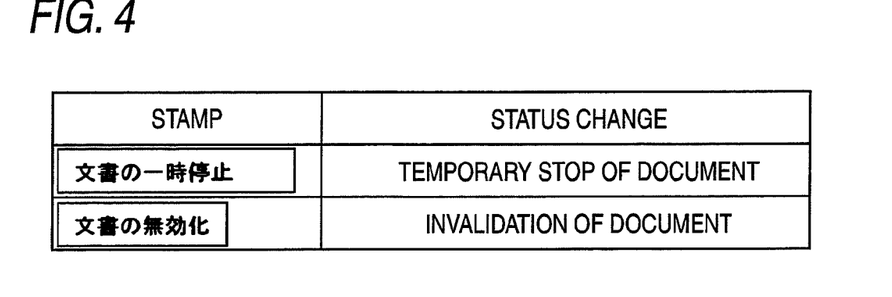
FIG. 4 is a drawing to show an example of the data descriptions of a stamp DB.

Information of a stamp put to change the status of the electronic document is registered in a stamp DB 216. FIG. 4 shows an example of the data descriptions of the stamp DB. In this example, information indicating the change description of the status is registered in association with the put image of the stamp (image of stamp seal; column of "STAMP" in the figure). If it is determined that the stamp to change the status is put using stamp ink of a specific color, etc., information also containing the color of the put image may be registered in the column of the put image of the stamp DB 216. In the organization using the system, the stamp used to change the status of each document is previously defined and the put image is previously registered in the stamp DB 216 in association with the status change description.

If a request for manipulation for an electronic document (for example, view, edit, print, etc.,) is issued from a client of the PC 300, etc., a document manipulation management section 202 references the document management DB 212 and the policy DB 214 and determines whether or not to permit the request. For example, if the policy server 200 holds the electronic document, the manipulation request for the electronic document arrives at the policy server 200 from the PC 300 and the document manipulation management section 202 determines whether or not to permit the request. When the electronic document is held in a different apparatus (called apparatus A) on the network 400, if the PC 300 makes a request for manipulation for the electronic document, the apparatus A receiving the request may inquire of the policy server 200 whether or not to permit the request. In response to the inquiry, the document manipulation management section 202 determines whether or not to permit the request and returns the determination result to the apparatus A, which then permits the request and performs processing or rejects the request in response to the determination result.

Figure 5:
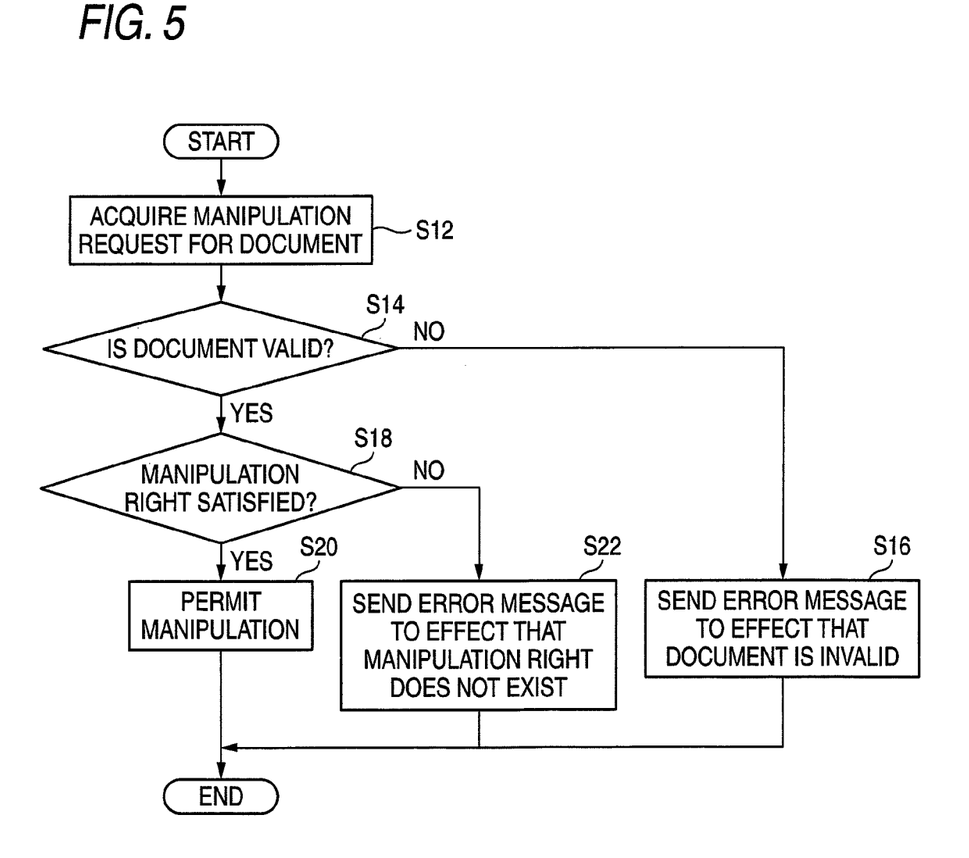
FIG. 5 is a flowchart to show an example of processing of a document manipulation management section.

FIG. 5 shows an example of a processing procedure of the document manipulation management section 202. In this procedure, the document manipulation management section 202 receives a manipulation request for a document (or an inquiry as to whether or not to permit the request) from an apparatus of the PC 300, etc., (S12). The request (or inquiry) contains the document ID for identifying the document to be manipulated, information for determining the type of requested manipulation, and the user ID for identifying the requester. The document manipulation management section 202 determines whether or not the document to be manipulated is "valid" in the document management DB 212 (S14). If the determination result is No, namely, the status of the document is "invalid" or "temporary stop", the document manipulation management section 202 returns a message to the effect that the manipulation request cannot be accepted (permitted) to the requester (or the inquirer) (S16). If the status is "invalid" or "temporary stop", the document cannot be used and thus such an answer is returned. At this time, the document manipulation management section 202 may return an error message indicating that the document cannot be used because it is in the "invalid" (or "temporary stop") state.

If the determination result at step S14 is Yes, the document manipulation management section 202 determines whether or not the requesting user is permitted to perform the requested manipulation under the security policy applied to the document to be manipulated (S18). For example, first the ID of the security policy applied to the document to be manipulated is found from the document management DB 212 and the description of the security policy corresponding to the ID is acquired from the policy DB 214. Whether or not the combination of the requester and the requested manipulation in the manipulation request corresponds to the combination of the user and the document manipulation right permitted for the user in the security policy is determined. If the combination corresponds to the combination, it is determined that the manipulation request is permitted; if not, it is determined that the manipulation request is not permitted.

If it is determined at step S18 that the requester has the right of the requested manipulation for the electronic document to be manipulated, the document manipulation management section 202 returns a message to the effect that the requested manipulation is permitted to the requester (or the inquirer) (S20). If it is determined that the requester does not have the right of the requested manipulation, the document manipulation management section 202 returns a message to the effect that the manipulation request cannot be accepted (permitted) to the requester (or the inquirer); for example, returns an error message to the effect that the manipulation is not accepted (permitted) because the user does not have the manipulation right (S22).

The basic operation of the policy server 200 is shown below. Next, the configuration and the operation for status change of a document will be discussed.

First, the stamp image extraction section 104 of the multiple function device 100 extracts a stamp image from (image of put stamp seal) from the image data of a paper document read through a scanner of the multiple function device 100. This extraction is executed based on the color of the image, for example. For example, when documents used in the organization are limited to monochrome, if it is determined in the organization that a stamp is put in any other color than black, an image in a color other than black in the read image data may be extracted as a stamp image. If it is determined in the organization that a stamp is put in ink of a specific color, the image of the color may be extracted as a stamp image from the read image.

The document ID recognition section 106 recognizes the document ID from the image data of a paper document read through the scanner. It is assumed that to print an electronic document managed in the policy server 200 on a sheet, the system is configured so that the document ID of the electronic document is printed, for example, in a predetermined location (for example, in the upper left corner of the document; two or more locations may be adopted) in the document. The document ID may be printed in the document in a predetermined format, such as a one-dimensional or two-dimensional image code of a bar code, etc., or a digit string or a character string. The document ID recognition section 106 cuts out the image of the document ID in the format from the read image and analyzes the image depending on the format, thereby recognizing the value of the document ID.

A status change control section 204 of the policy server 200 receives a change request of the status from the multiple function device 100 and executes status change processing responsive to the request. A stamp recognition section 206 determines which status change manipulation registered in the stamp DB 216 corresponds to the stamp image sent from the multiple function device 100. The status change control section 204 changes the status of the document to be manipulated in the document management DB 212 in accordance with the determination result.

Figure 6:
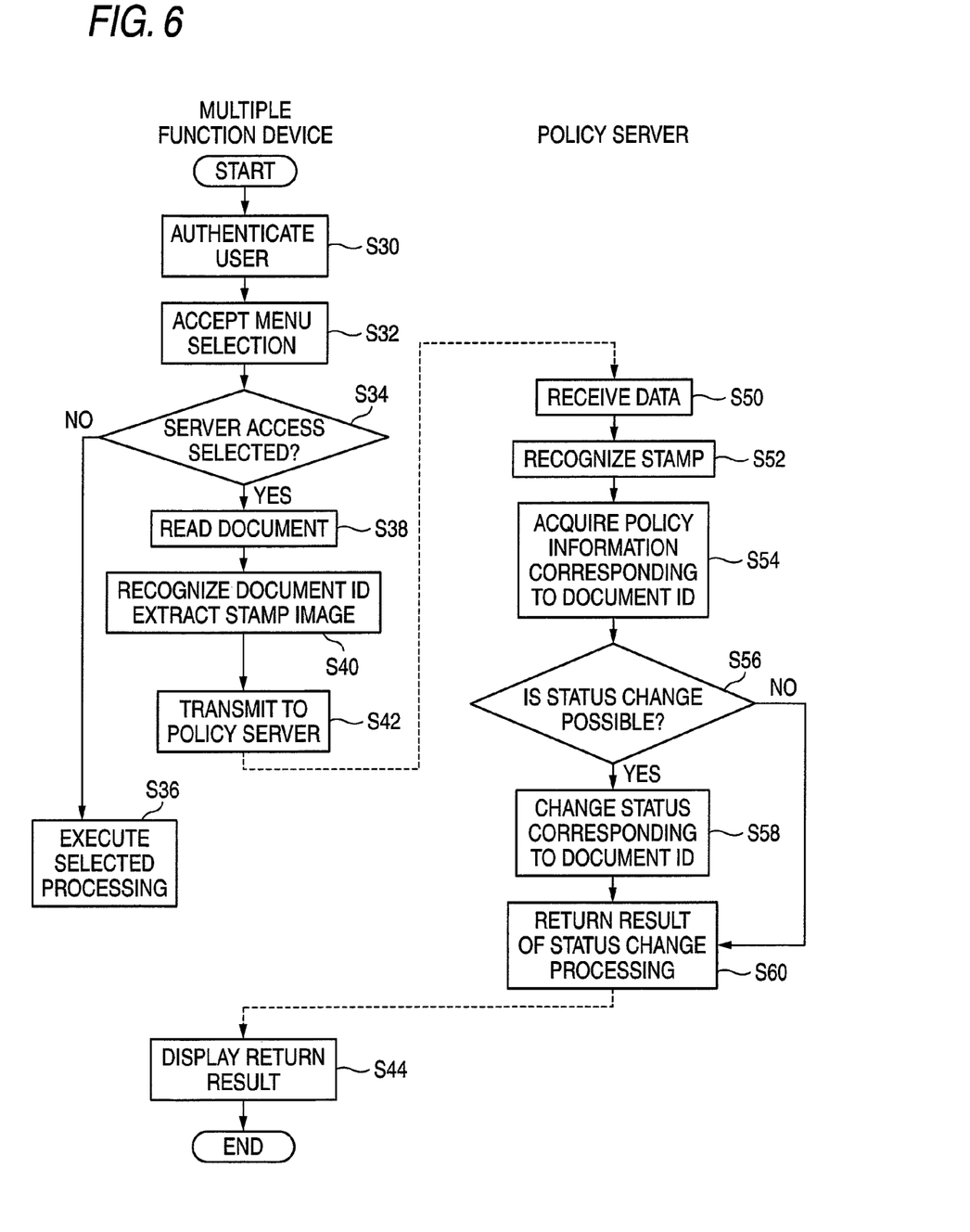
FIG. 6 is a flowchart to show an example of status change processing.
Figure 7:
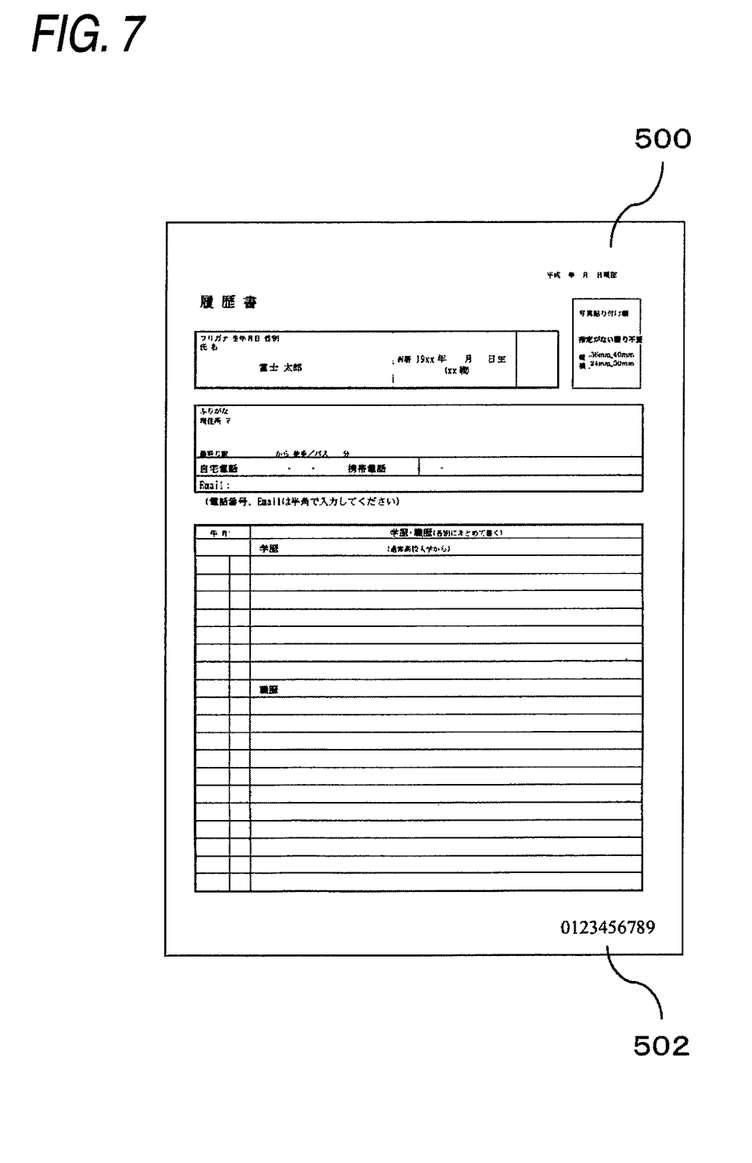
FIG. 7 is a drawing to show an example of a document.
Figure 8:
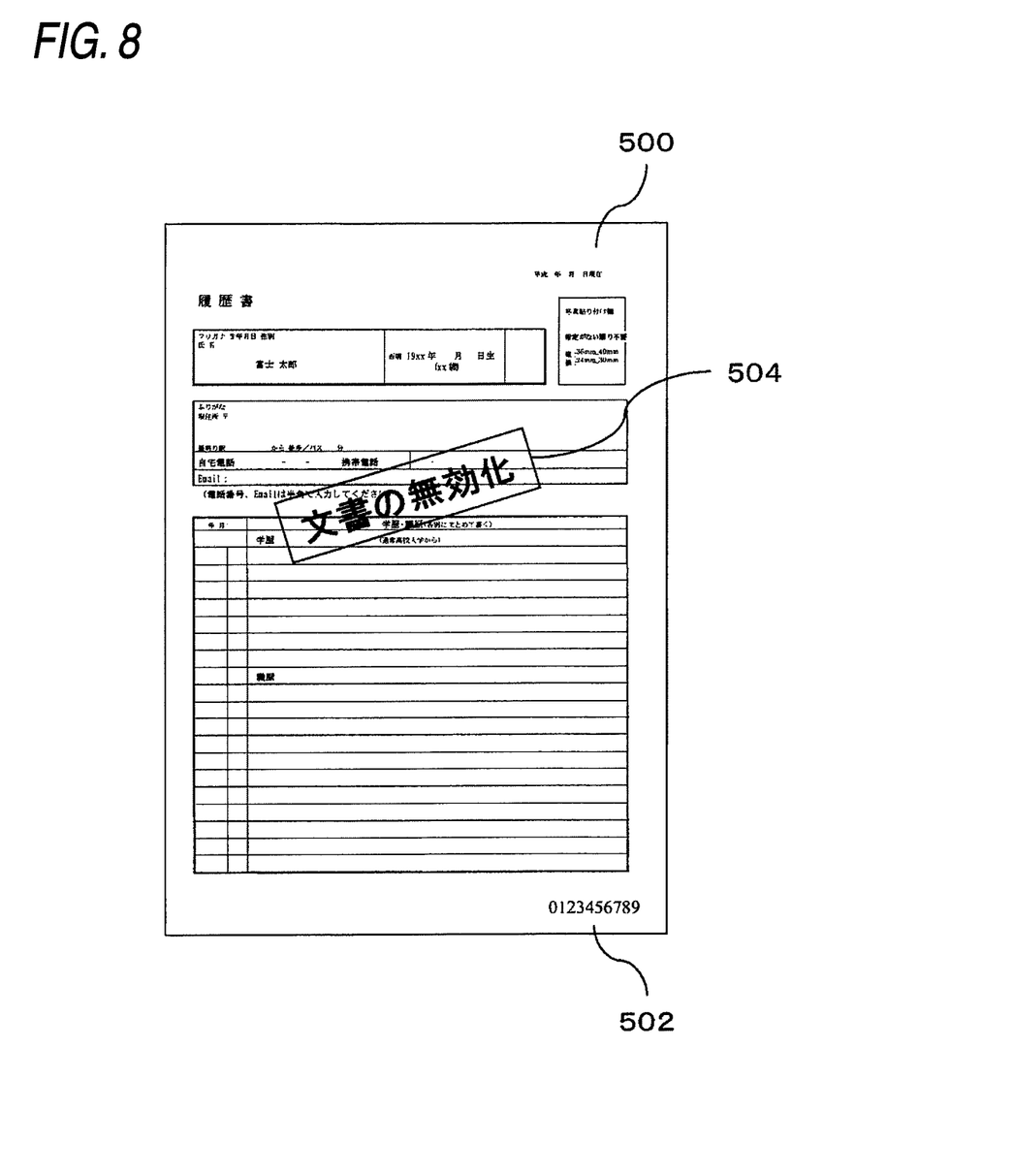
FIG. 8 is a drawing to show an example of the document on which a stamp is put.

Next, a flow of the status change processing of an electronic document in the system will be discussed with reference to FIGS. 6 to 8.

First, to change the status of an electronic document, the user puts a stamp on the print result of the document (containing the document ID) and let the multiple function device 100 read it. For example, a document ID 502 is printed in the lower right corner of a document 500 illustrated in FIG. 7. If the user wants to change the status of the original electronic document of the document 500 to "invalid", the user puts a stamp predetermined to be put when the status is set to invalidation on the document 500. FIG. 8 illustrates the document containing a put image 504 of the put result of the stamp.

The user comes to the multiple function device 100 and authenticates the user by using the IC card and the IC card reader, etc., (S30). Accordingly, the multiple function device 100 recognizes the user performing the manipulation. The multiple function device 100 displays a manipulation menu screen and accepts selection of manipulation from the user (S32). The menu shows the access function to the policy server 200 as an option in addition to the basic functions of the multiple function device 100 such as copy, scan, and FAX transmission. To change the status of an electronic document, the access function to the policy server 200 is used. For example, the user sets a paper document in the document feeder, selects any desired function out of the menu, and presses a start button, thereby giving a command for execution of the selected function.

If the user selects any other function than the access function to the policy server 200 at S34, the multiple function device 100 executes processing for the selected function in response to pressing the start button.

If the function selected by the user is the access function to the policy server 200 at S34, when the user presses the start button, the multiple function device 100 reads the setup paper document (S38) and extracts a stamp image from the read image and recognizes the value of the document ID (S40). To extract the stamp image, for example, an image having a color contained in the range of the previously specified color may be extracted. The multiple function device 100 sends the user information (user ID, etc.,) specified by the user authentication, the recognized document ID, and the extracted stamp image to the policy server 200 (S42).

The status change control section 204 of the policy server 200 receives the data of the user information, the document ID, and the stamp image sent from the multiple function device 100 (S50) and requests the stamp recognition section 206 to perform recognition processing of the stamp image (S52). The stamp recognition section 206 performs matching processing of the stamp image with each stamp image registered in the stamp DB 216. Stamp images having similarity equal to or greater than predetermined similarity for the stamp image to be recognized is found from the stamp DB 216. The stamp image having the highest similarity is determined as the recognition result of the stamp image to be recognized and the description of the stamp change corresponding to the recognition result (for example, "invalid", "temporary stop", and so on) is returned to the status change control section 204. The status change control section 204 finds the policy ID corresponding to the received document ID from the document management DB 212 and acquires the description of the security policy corresponding to the policy ID from the policy DB 214 (S54).

The status change control section 204 determines whether or not the status change description indicated by the stamp image recognized at step S52 matches the security policy acquired at step S54 (S56). For each user (or each group), the change right of the document status performed for the user is registered in the security policy, as illustrated in FIG. 3. At step S56, whether or not the user indicated by the user information sent from the multiple function device 100 is permitted to make status change indicated by the stamp image is determined from the correspondence between the user and the document status change right. For example, it is assumed that the policy ID corresponding to the document ID of the read document is "AABB12345", that the user causing the reader to read the document belongs to the personnel department, and that the stamp indicating "invalidation of document" is put. In this case, in the security policy shown in FIG. 3, the status change right of invalidation is given to the personnel department for the document of the policy and therefore invalidation specified by the stamp is permitted (the determination result at step 56 is Yes).

If the change description indicated by the stamp satisfies the document status change right recognized in the security policy, the status change control section 204 may further determine whether or not the change is permitted from the current status of the electronic document to be recognized. That is, in the example, the status to which a transition can be made is previously defined (registered in the policy server 200) for each status. If the change description indicated by the stamp is the status to which a transition can be made from the current status, the change is permitted; otherwise, the change is not permitted. For example, if it is only defined that when the current status is "valid", a transition to "temporary stop" or "invalid" is possible, the status change from "invalid" to "valid" is not permitted. The definition may be determined as desired.

If it is determined that changing status is permitted, the status change control section 204 changes the status of the electronic document whose status is to be changed in the document management DB 212 in accordance with the change description recognized from the stamp image (S58). For example, if the stamp indicates "invalidation", the status of the electronic document is changed to "invalid" at S58. The result of the change processing is returned to the multiple function device 100 transmitting the request (S60). In this case, as the result of the change processing, for example, information indicating a message indicating the status change success, for example, a message like "the status of the document" has been changed to "invalid" may be sent to the multiple function device 100. The multiple function device 100 displays the processing result on the UI screen (S44).

If it is determined at step S56 that the status change indicated by the stamp is impossible, the status change control section 204 does not change the status of the target document and returns the processing result indicating that the specified status change is not permitted is returned to the multiple function device 100 (S60). The multiple function device 100 displays the return result on the UI screen (S44) and the user sees the display and knows that the status is not changed.

Figure 9:
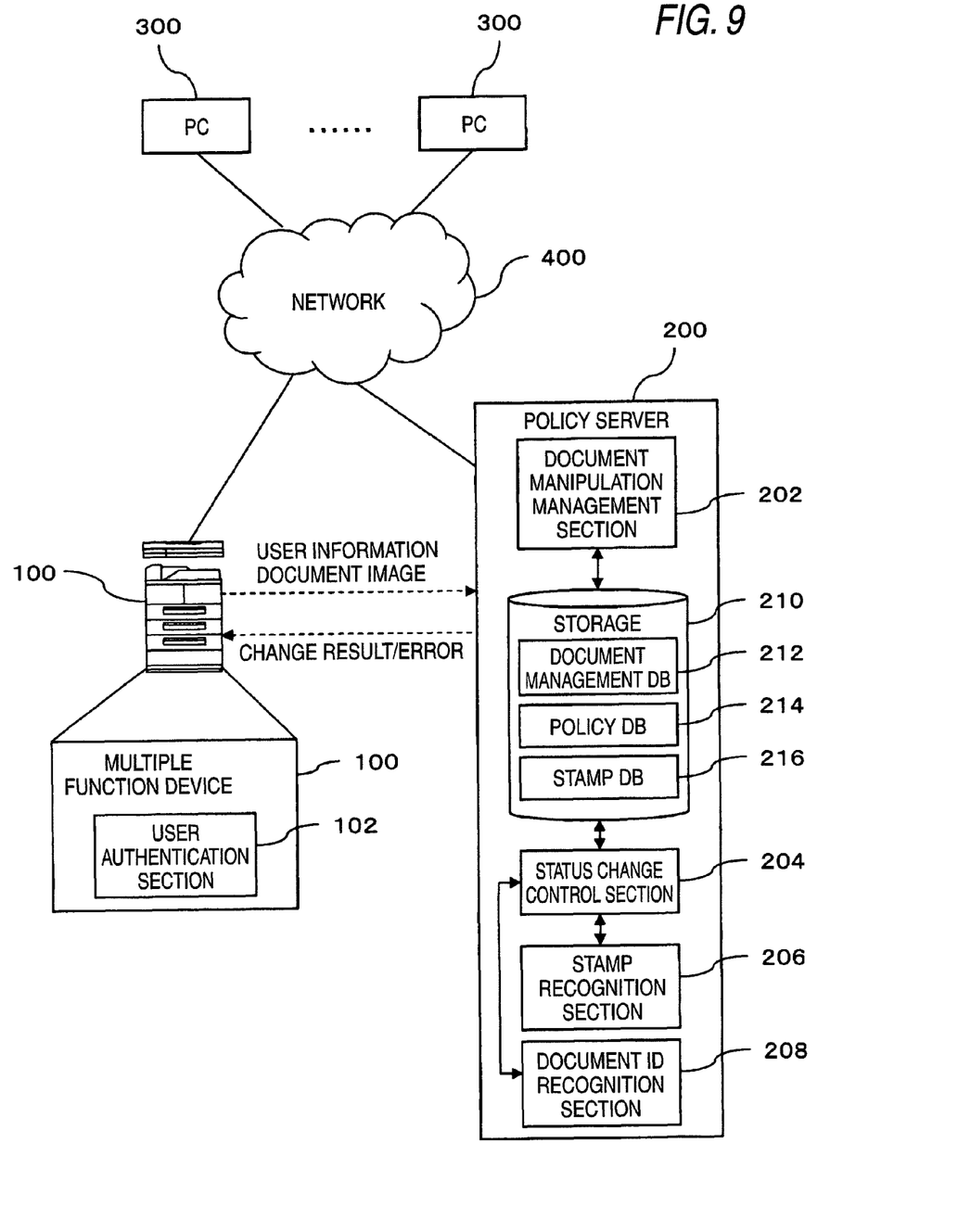
FIG. 9 is a drawing to show another example of the system configuration.

In the example described above, the multiple function device 100 recognizes the document ID from the image of the document and extracts the stamp image, but this is only an example. Instead, in an example shown in FIG. 9, the multiple function device 100 is not provided with the document ID recognition section or the stamp image extraction section 104. If access to the policy server is selected at step S34, the multiple function device 100 does not recognize the document ID and does not extract the stamp image and simply sends the image of the read document and the user information to the policy server 200. On the other hand, in the policy server 200, a document ID recognition section 208 recognizes the value of the document ID from the image and the stamp recognition section 206 extracts a stamp image from the image and recognizes the stamp image.

As another example, the stamp DB 216 may be provided in the multiple function device 100 and the multiple function device 100 may recognize the stamp image put on the read image. In this case, information determining the status change description indicated by the stamp image rather than the stamp image is sent from the multiple function device 100 to the policy server 200.

Next, a modified example will be discussed. In the embodiment described above, the status concerning the validity about an electronic document is changed using the stamp. In contrast, in the modified example, further the status about the validity of a security policy can be changed according to a stamp for the document to which the security policy is applied.

The system configuration of the modified example may be similar to the configuration of the embodiment described above (for example, see FIG. 1). However, in the modified example, the policy server 200 holds information of the status concerning the validity of each security policy. For example, as illustrated in FIG. 10, the policy DB 214 is provided with a column indicating the status of each security policy (the rightmost column in the figure).

The status concerning the validity of a security policy includes "valid", "invalid", "temporary stop", etc., for example. The "valid" is a state in which the security policy is valid in the organization using the system. That is, for the document to which the security policy of "valid" is applied, user manipulation is limited in accordance with the security policy. The "invalid" is a state in which the security policy is invalid in the organization. For example, if the security policy becomes old and does not comply with the current state, it is considered that the security policy is made invalid. For example, the document to which the security policy of "invalid" is applied may be made unavailable (unusable) from the user depending on the concept of the organization. That is, in the example, one specific security policy is made invalid, whereby all documents to which the policy is applied become unusable. The "temporary stop" is a state in which the security policy is temporarily invalid. The policy once made "invalid" cannot be restored to "valid" in ordinary operation, but the policy in the "temporary stop" state can be restored to "valid" by manipulation of validation. For example, if it becomes necessary to check or correct the description of the security policy, the status of the policy is set to "temporary stop", whereby use of the document to which the policy is applied is temporarily prohibited and meanwhile check or correction can be made.

Figure 10:
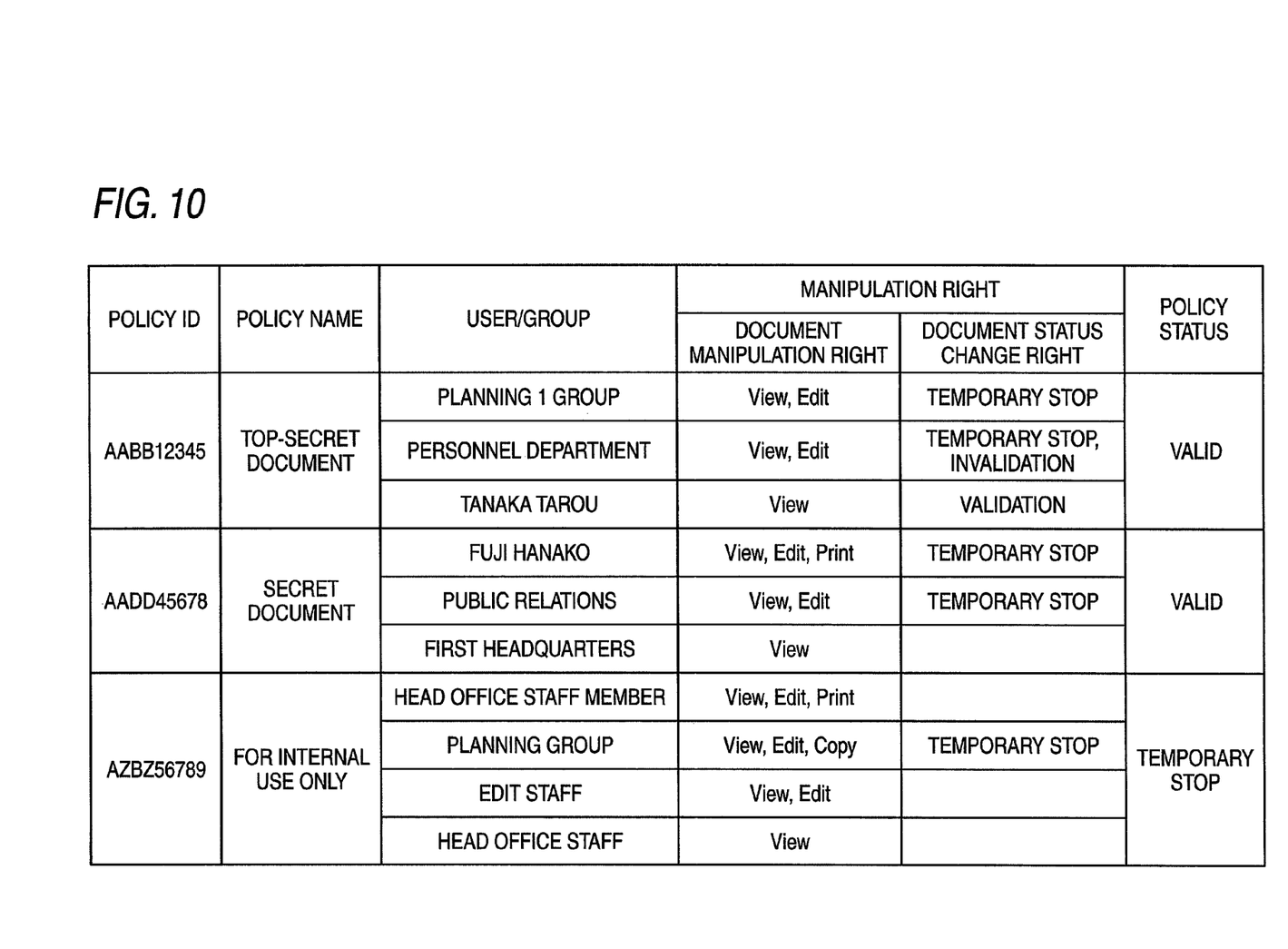
FIG. 10 is a drawing to show an example of the data descriptions of a policy DB in a modified example.

Although not shown in FIG. 10, for example, information of the change right of the status of the security policy may be registered in the policy DB 214. For example, information indicating what change is permitted for the status of the security policy for each user (or each group) for each security policy may be registered in the policy DB 214.

In the modified example, a stamp indicating the change description of the status of the security policy is registered in the stamp DB 216. In an example shown in FIG. 11, in addition to stamp images of "temporary stop" and "invalidation" about documents, stamp images of "temporary stop" and "invalidation" about security policy are registered in the stamp DB 216.

Figure 11:
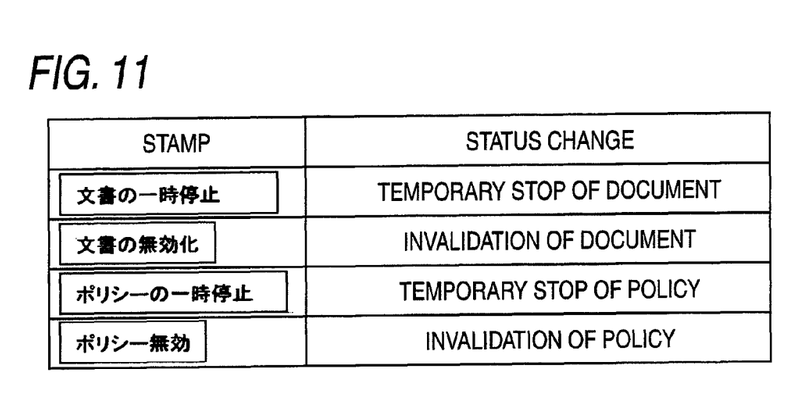
FIG. 11 is a drawing to show an example of the data descriptions of a stamp DB in the modified example.

In the example, if the use wants to change the status of the security policy applied to one document, the user puts a stamp indicating the status change description on the print result of the document and causes the multiple function device 100 to read the stamp. Then, the multiple function device 100 sends the image of the stamp, the user information, and the document ID to the policy server 200. The status change control section 204 of the policy server 200 finds the policy ID corresponding to the document ID from the document management DB 212 and acquires the security policy corresponding to the policy ID from the policy DB 214. The stamp image is recognized and if the status change description of the recognition result is in the range permitted for the user, the status of the security policy in the policy DB 214 is changed in accordance with the change description. If the status change description is not in the range permitted for the user, the status change control section 204 does not change the status. For the status of the security policy, a transition rule may be previously determined and change violating the transition rule may be unaccepted. For example, the transition rule may be determined as desired in such a manner that if the current security policy status is "valid", a transition to "temporary stop" or "invalid" can be made or that status change from "invalid" to "valid" is impossible.

Figure 12:
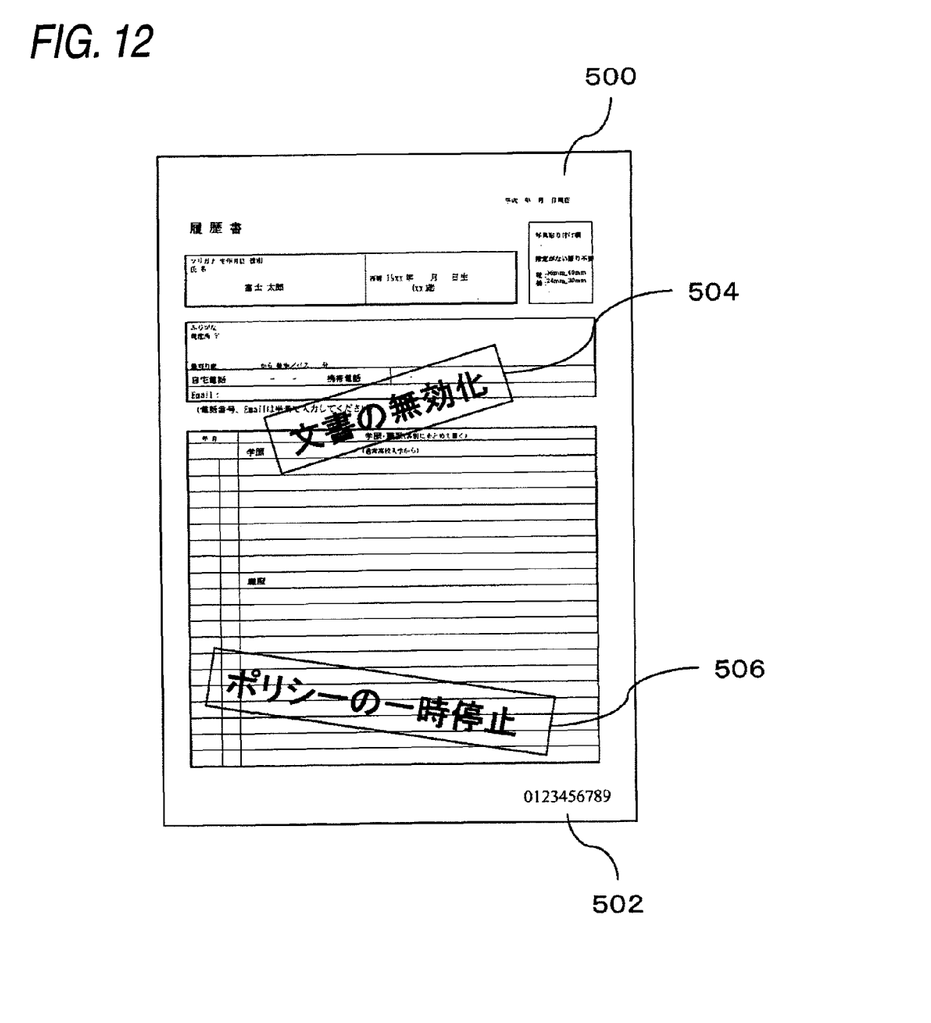
FIG. 12 is a drawing to show an example of a document on which two stamps are put.

Next, another modified example will be discussed. In the modified example, as illustrated in FIG. 12, processing when the multiple function device 100 reads a paper document on which a plurality of stamp images 504 and 506 are put will be discussed.

Figure 13:
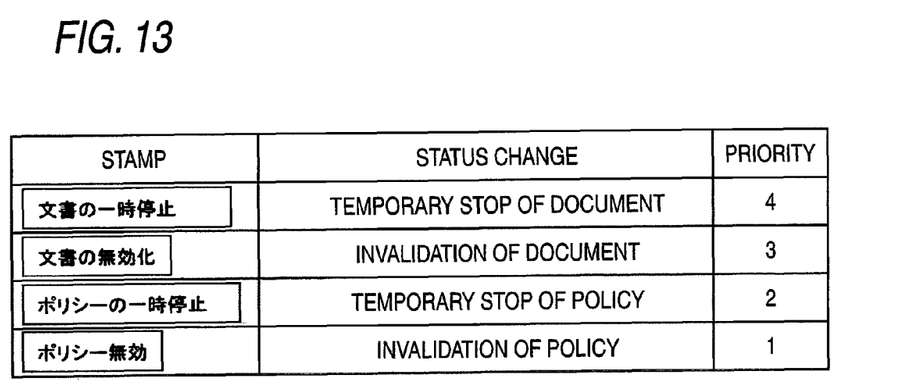
FIG. 13 is a drawing to show an example of the data descriptions of a stamp DB when priority is assigned to each stamp.

To handle such a case, in the modified example, the priority about the status change description indicated by each stamp image is registered in the stamp DB 216. FIG. 13 shows an example of priority assignment. In this example, the priority of invalidation of policy is the highest.

If it is found that the image of the document read by the multiple function device 100 contains a plurality of stamp images, the status change control section 204 checks whether or not the status change description of the stamp image with the higher priority is within the range of the change right of the user (further the transition rule is satisfied depending on the situation). If the status change description is within the range (further the transition rule is satisfied depending on the situation), the status change control section 204 changes the status of the document or the security policy in accordance with the description.

In the embodiment and the modified examples described above, a paper document on which a stamp is put is read through the multiple function device 100, but may be read through a reader having an image read function such as a digital scanner in place of the multiple function device 100, of course.

The portions of the information processing function of the image processing apparatus of the multiple function device 100, the policy server 200, etc., illustrated above are implemented by causing a general-purpose computer to execute programs representing the processing of the function modules described above, for example. The computer has a circuit configuration wherein a microprocessor of a CPU, etc., memory (primary storage) of random access memory (RAM), read-only memory (ROM), etc., an HDD controller for controlling an HDD (hard disk drive), various I/O (input/output) interfaces, a network interface for controlling connection to a network such as a local area network, and the like as hardware are connected through a bus, for example. A disk drive for reading from and/or writing to a portable disk record medium of a CD, a DVD, etc., a memory reader-writer for reading from and/or writing to portable nonvolatile record media of various standards such as flash memory, and the like may be connected to the bus through the I/O interface, for example. The programs describing the processing of the function modules illustrated above are stored in fixed storage of a hard disk drive, etc., via a record medium of a CD, a DVD, etc., or via communication means of a network, etc., and are installed in the computer. The programs stored in the fixed storage are read into the RAM and are executed by the microprocessor of the CPU, etc., whereby the function modules illustrated above are implemented. Some or all of the function modules may be implemented as a hardware circuit of a dedicated LSI (Large Scale Integration), an ASIC (Application Specific Integrated Circuit), an FPGA (Field Programmable Gate Array), etc.

The foregoing description of the exemplary embodiment of the present invention has been provided for the purpose of illustration and description. It is not intended to be exhaustive or to limit the invention to the precise forms disclosed. Obviously, many modifications and various will be apparent to practitioners skilled in the art. The embodiments were chosen and described in order to best explain the principles of the invention and its practical application, thereby enabling other skilled in the art to understand the invention for various embodiments and with the various modifications as are suited to the particular use contemplated. It is intended that the scope of the invention be defined by the following claims and their equivalents.

What is claimed is:

1. A document management system comprising:
    a document state storage unit that stores document state information representing states concerning document validity of electronic documents stored in a document storage unit;
    a manipulation control unit that refuses a request from a user for manipulating one of the electronic documents when the document state information corresponding to the one of the electronic documents indicates that the one of the electronic documents is invalid at present;
    a stamp image storage unit that stores a plurality of stamp images each respectively corresponding to one of the states represented by the document state information;
    an extracting unit that recognizes a read stamp image of a paper document inputted by the user, the read stamp image corresponds to one of the states represented by the document state information;
    a document ID recognizing unit that recognizes an electronic document having a given state corresponding to the paper document inputted by the user; and
    a state change unit that changes the given state of the electronic document based on the read stamp image of the paper document and its corresponding one of the states.

2. The document management system according to claim 1, wherein the document state storage unit stores authority information indicating change authority of each user with respect to the document state information, and the state change unit does not change the document state information when the given state does not satisfy the change authority of the user inputting the paper document with respect to the given electronic document.

3. The document management system according to claim 1, wherein the stamp image storage unit further stores an order of priority with respect to the stamp images stored in the stamp storage unit, and when a plurality of stamp images are recognized from the paper document, the state change unit changes the document state information concerning the given electronic document to represent a high priority state corresponding to one of the stamp images which has the highest order of the priority in the stamp images and is determined to correspond to the read stamp image.

4. The document management system according to claim 1 further comprising:

an authority storage unit that stores at least one type of authority information representing manipulation right of each user for the electronic documents and manipulation right validity state representing states concerning manipulation right validity; and an applied authority storage unit that stores applying information indicating which kind of authority information is applied to each of the electronic documents stored in the document storage unit, wherein the stamp image storage unit further stores a plurality of stamp images each corresponding to any one of possible states represented by the manipulation right validity state; and the state change unit that changes the manipulation right validity state concerning a certain electronic document of the electronic documents to a certain manipulation right validity state when a certain stamp image of the stamp images stored in the stamp storage unit is determined to correspond to the read stamp image and the certain stamp image corresponds to the certain manipulation right validity state, the certain electronic document corresponding to the paper document, and the manipulation control unit that refuses the request from the user when the manipulation right validity state applied to the one of the electronic documents is invalid at present.

5. A non-transitory computer readable medium storing a program causing a computer to execute a process for managing documents, the process comprising:

storing document state information representing states concerning document validity of electronic documents;

refusing a request from a user for manipulating one of the electronic documents when the document state information corresponding to the one of the electronic documents indicates that the one of the electronic documents is invalid at present;

storing a plurality of stamp images each respectively corresponding to one of the states represented by the document state information;

extracting a read stamp image of a paper document inputted by the user, the read stamp image corresponds to one of the states represented by the document state information;

recognizing an electronic document having a given state corresponding to the paper document inputted by the user; and changing the given state of the electronic document based on the read stamp image of the paper document and its corresponding one of the states.

6. A document management method comprising:

storing document state information representing states concerning document validity of electronic documents;

refusing a request from a user for manipulating one of the electronic documents when the document state information corresponding to the one of the electronic documents indicates that the one of the electronic documents is invalid at present;

storing a plurality of stamp images each respectively corresponding to one of the states represented by the document state information;

extracting a read stamp image of a paper document inputted by the user, the read stamp image corresponds to one of the states represented by the document state information;

recognizing an electronic document having a given state corresponding to the paper document inputted by the user; and changing the given state of the electronic document based on the read stamp image of the paper document and its corresponding one of the states.

* * * * *